(12) United States Patent
Konuma et al.

(10) Patent No.: US 8,947,755 B2
(45) Date of Patent: Feb. 3, 2015

(54) OPTICAL SCANNING DEVICE AND IMAGE DISPLAY APPARATUS

(71) Applicant: Hitachi Media Electronics Co., Ltd., Yokohama-shi, Kanagawa (JP)

(72) Inventors: Nobuhiro Konuma, Yokohama (JP); Michio Hatagi, Chigasaki (JP)

(73) Assignee: Hitachi-LG Data Storage Inc., Tokyo (JP)

( * ) Notice: Subject to any disclaimer, the term of this patent is extended or adjusted under 35 U.S.C. 154(b) by 178 days.

(21) Appl. No.: 13/767,831

(22) Filed: Feb. 14, 2013

(65) Prior Publication Data
US 2013/0215487 A1     Aug. 22, 2013

(30) Foreign Application Priority Data
Feb. 21, 2012   (JP) .................. 2012-034801

(51) Int. Cl.
*G02B 26/08*     (2006.01)
*G02B 26/10*     (2006.01)
*G02B 27/00*     (2006.01)

(52) U.S. Cl.
CPC .......... *G02B 26/105* (2013.01); *G02B 27/0018* (2013.01)
USPC ...................................... 359/212.2; 359/298

(58) Field of Classification Search
CPC . G02B 26/123; G02B 26/105; G02B 27/0018
See application file for complete search history.

(56) References Cited

U.S. PATENT DOCUMENTS

| | | | |
|---|---|---|---|
| 2003/0016435 | A1 | 1/2003 | Atobe et al. |
| 2006/0139718 | A1 | 6/2006 | Ishihara |
| 2009/0073526 | A1 | 3/2009 | Uchikawa |
| 2010/0330332 | A1 | 12/2010 | Quenzer et al. |

FOREIGN PATENT DOCUMENTS

| | | |
|---|---|---|
| JP | 9-159937 A | 6/1997 |
| JP | 2006-178346 A | 7/2006 |
| JP | 2009-069457 A | 4/2009 |
| JP | 2011-112807 A | 6/2011 |
| JP | 2011-517626 A | 6/2011 |

*Primary Examiner* — James Phan
(74) *Attorney, Agent, or Firm* — McDermott Will & Emery LLP

(57) ABSTRACT

An optical scanning device includes a rotationally-moving mirror on which a reflection plane is provided in a rotationally-movable manner, and a sealing unit over which a light-transmissive cover is provided, a first plane of the light-transmissive cover, a second plane of the light-transmissive cover, and the reflection plane of the rotationally-moving mirror within a rotationally-moving range being non-parallel to each other, the first plane being on the opposite side to the side of the rotationally-moving mirror, the second plane being on the side of the rotationally-moving mirror.

8 Claims, 10 Drawing Sheets

OPTICAL SCANNING DEVICE AND IMAGE DISPLAY APPARATUS

INCORPORATION BY REFERENCE

The present application claims priority from Japanese application JP2012-034801 filed on Feb. 21, 2012, the content of which is hereby incorporated by reference into this application.

BACKGROUND OF THE INVENTION

The present invention relates to an optical scanning device and an image display apparatus. For example, the present invention is preferable when applied to an image display apparatus for displaying an image by scanning a light beam.

From conventionally, the proposal has been made concerning an image display apparatus for projecting an image onto a screen surface using a laser light-source. In general, in an image display apparatus like this, a light beam emitted from the laser light-source is modulated in accordance with an image signal. Moreover, this light beam modulated is two-dimensionally scanned over the screen by a scanning-system device. Finally, the image based on the image signal is displayed onto the screen by utilizing the afterimage effect of this scanned light beam. The scanning-system device is formed by, e.g., combining with each other two units of polygon mirrors or galvanic mirrors for one-dimensionally scanning a light beam. The light beam emitted from the laser light-source is two-dimensionally scanned by the scanning-system device formed in this way.

Furthermore, in recent years, the proposal has been made regarding an image display apparatus that uses a MEMS mirror, i.e., a type of MEMS (: Micro-Electro-Mechanical Systems) devices. The MEMS mirror (which, hereinafter, will also be referred to as "a rotationally-moving mirror") is a microscopic rotationally-moving mirror for two-dimensionally scanning a light beam by causing the mirror surface to two-dimensionally iterate and rotationally move.

In JP-A-9-159937, the disclosure has been made concerning an optical modulation apparatus where a light-transmissive cover is fixed onto a MEMS housing that includes the rotationally-moving mirror therein. The material used as the light-transmissive cover is a one such as, e.g., a glass plate. In an optical modulation apparatus like this, it is made possible to prevent the mixture of foreign substances into the MEMS housing, and to protect the rotationally-moving mirror therein.

By the way, in the image display apparatus for displaying an image by two-dimensionally scanning a light beam with the use of the rotationally-moving mirror, the following fact has been known: Namely, a distortion (i.e., image distortion) is caused to occur on the image displayed. In JP-A-2006-178346, the description has been given regarding an image display apparatus for correcting an image distortion like this.

SUMMARY OF THE INVENTION

In the image display apparatus disclosed in JP-A-9-159937, however, the following phenomenon takes place: Namely, when the light beam emitted from the laser light-source transmits through the light-transmissive cover, a reflected light of the light beam is caused to occur on the external plane (i.e., outer-side surface of the MEMS housing) of the light-transmissive cover. If the external plane of the light-transmissive cover and the reflection plane of the rotationally-moving mirror are parallel to each other, the reflected light that has occurred on the external plane of the light-transmissive cover is then reflected by the rotationally-moving mirror. As a result of this reflection, the reflected light is equipped with the same angle as the angle of a light beam which is to be scanned onto a screen or the like. In a case like this, the reflected light that has occurred on the external plane of the light-transmissive cover is sometimes projected onto the screen. As a consequence, the reflected light is superimposed on the image that is projected by the image display apparatus. Accordingly, there exists a problem that this superimposing deteriorates the picture quality.

Here, in JP-A-2009-69457, JP-A-2011-112807, and JP-A-2011-517626, the disclosures have been made concerning the following image display apparatuses: Namely, these image display apparatuses control the reflection direction of the reflected light that has been caused to occur by the external plane of the light-transmissive cover. By performing this direction control, the image display apparatuses prevent the reflected light from mixing into the image-projected area on the screen or the like (this operation, hereinafter, will also be referred to as "suppressing the reflected light").

In the image display apparatus disclosed in JP-A-2009-69457, the light-transmissive cover is of a profile that the external plane and the internal plane of the cover satisfy a relationship of being not parallel to each other (i.e., non-parallel relationship). Moreover, the light-transmissive cover is so provided as to become non-parallel to the movable mirror that lies in its neutral state. In the image display apparatus disclosed in JP-A-2009-69457, however, the following situation is conceivable: Namely, the cover is non-parallel to the movable mirror in its neutral state; but, if the mirror does move, the cover turns out to be parallel to the mirror. In a case like this, it is impossible to suppress the reflected light that occurs on the external plane of the cover.

In a MEMS optical scanner, i.e., the image display apparatus disclosed in JP-A-2011-112807, a light-transmissive molded unit is formed on a flat plane on the opposite side to the side of a mirror-formed substrate in the cover substrate. At this time, the molded unit is formed such that it becomes non-parallel to a flat plane on the mirror-formed-substrate side in the cover substrate. In the image display apparatus disclosed in JP-A-2011-112807, however, the flat plane on the mirror-formed-substrate side in the cover substrate sometimes becomes parallel to the rotationally-moving mirror. In a case like this, it is impossible to suppress a reflected light that occurs on the flat plane on the mirror-formed-substrate side.

Also, in the image display apparatus disclosed in JP-A-2011-517626, a concave portion is formed in the cover unit so that the cover becomes non-parallel to a cover's reference flat plane. In the image display apparatus disclosed in JP-A-2011-517626, it is possible to control the reflected light on the external plane of the cover. No consideration, however, is given to the suppression of a reflected light that occurs on the internal plane of the cover after the reflected light on the external plane has been controlled.

Incidentally, in the image display apparatuses disclosed in JP-A-2009-69457 and JP-A-2011-112807 as well, no consideration is given to the suppression of the second reflected light. If the reflected light on the internal plane of the cover mixes into the image-projected area, there exists the problem that the picture quality becomes deteriorated. This situation is similar to the case where the reflected light on the external plane of the cover mixes into the image-projected area.

The present invention has been devised in view of the above-described points. Namely, an object of the present invention is to propose an optical scanning device and an image display apparatus which make it possible to prevent the unnecessary reflected lights from mixing into the image-projected area, and to prevent the deterioration of a displayed image.

In order to accomplish the above-described object, in the present invention, in an optical scanning device including a rotationally-moving mirror on which a reflection plane for reflecting light is provided in a rotationally-movable manner, and a sealing unit for sealing the rotationally-moving mirror in its inside, a light-transmissive cover is provided on the side of the sealing unit from which the light is entering the rotationally-moving mirror, the light-transmissive cover being formed of a light-transmissive material, a first plane of the light-transmissive cover, a second plane of the light-transmissive cover, and the reflection plane of the rotationally-moving mirror within a rotationally-moving range being non-parallel to each other, the first plane being on the opposite side to the side of the light-transmissive cover on which the rotationally-moving mirror is provided, the second plane being on the side of the light-transmissive cover on which the rotationally-moving mirror is provided, the first plane and the second plane being provided so that a first reflected light and a second reflected light reach areas that are different from an image-projected area onto which an image is projected by a third reflected light, the first reflected light being caused to occur such that a partial light of the light that is entering the first plane is reflected by the first plane, and leaves for the outside of the optical scanning device, the second reflected light being caused to occur such that a partial light of the light that has passed through the first plane is reflected by the second plane, and leaves for the outside of the optical scanning device, the third reflected light being caused to occur such that the light that has passed through the second plane is reflected by the reflection plane of the rotationally-moving mirror, and leaves for the outside of the optical scanning device.

Also, in the present invention, in an image display apparatus including a light-source unit for emitting light, and an optical scanning unit for reflecting the light emitted from the light-source unit, and scanning the light toward an external display apparatus, wherein the optical scanning unit includes a rotationally-moving mirror on which a reflection plane for reflecting the light is provided in a rotationally-movable manner, and a sealing unit for sealing the rotationally-moving mirror in its inside, a light-transmissive cover being provided on the side of the sealing unit from which the light is entering the rotationally-moving mirror, the light-transmissive cover being formed of a light-transmissive material, a first plane of the light-transmissive cover, a second plane of the light-transmissive cover, and the reflection plane of the rotationally-moving mirror within a rotationally-moving range being non-parallel to each other, the first plane being on the opposite side to the side of the light-transmissive cover on which the rotationally-moving mirror is provided, the second plane being on the side of the light-transmissive cover on which the rotationally-moving mirror is provided, the first plane and the second plane being provided so that a first reflected light and a second reflected light reach areas that are different from an image-projected area onto which an image is projected by a third reflected light, the first reflected light being caused to occur such that a partial light of the light that is entering the first plane is reflected by the first plane, and leaves for the outside of the optical scanning unit, the second reflected light being caused to occur such that a partial light of the light that has passed through the first plane is reflected by the second plane, and leaves for the outside of the optical scanning unit, the third reflected light being caused to occur such that the light that has passed through the second plane is reflected by the reflection plane of the rotationally-moving mirror, and leaves for the outside of the optical scanning unit.

Incidentally, in the optical scanning device and the image display apparatus in the present invention, the first reflected light and the second reflected light are also allowed to reach a boundary portion of the image-projected area onto which an image is projected by the third reflected light.

According to the present invention, it becomes possible to implement the optical scanning device and the image display apparatus which make it possible to prevent the unnecessary reflected lights from mixing into the image-projected area, and to prevent the lowering in the displayed picture quality.

Other objects, features and advantages of the invention will become apparent from the following description of the embodiments of the invention taken in conjunction with the accompanying drawings.

DETAILED DESCRIPTION OF THE EMBODIMENT (1) 1st Embodiment

Figure 1:
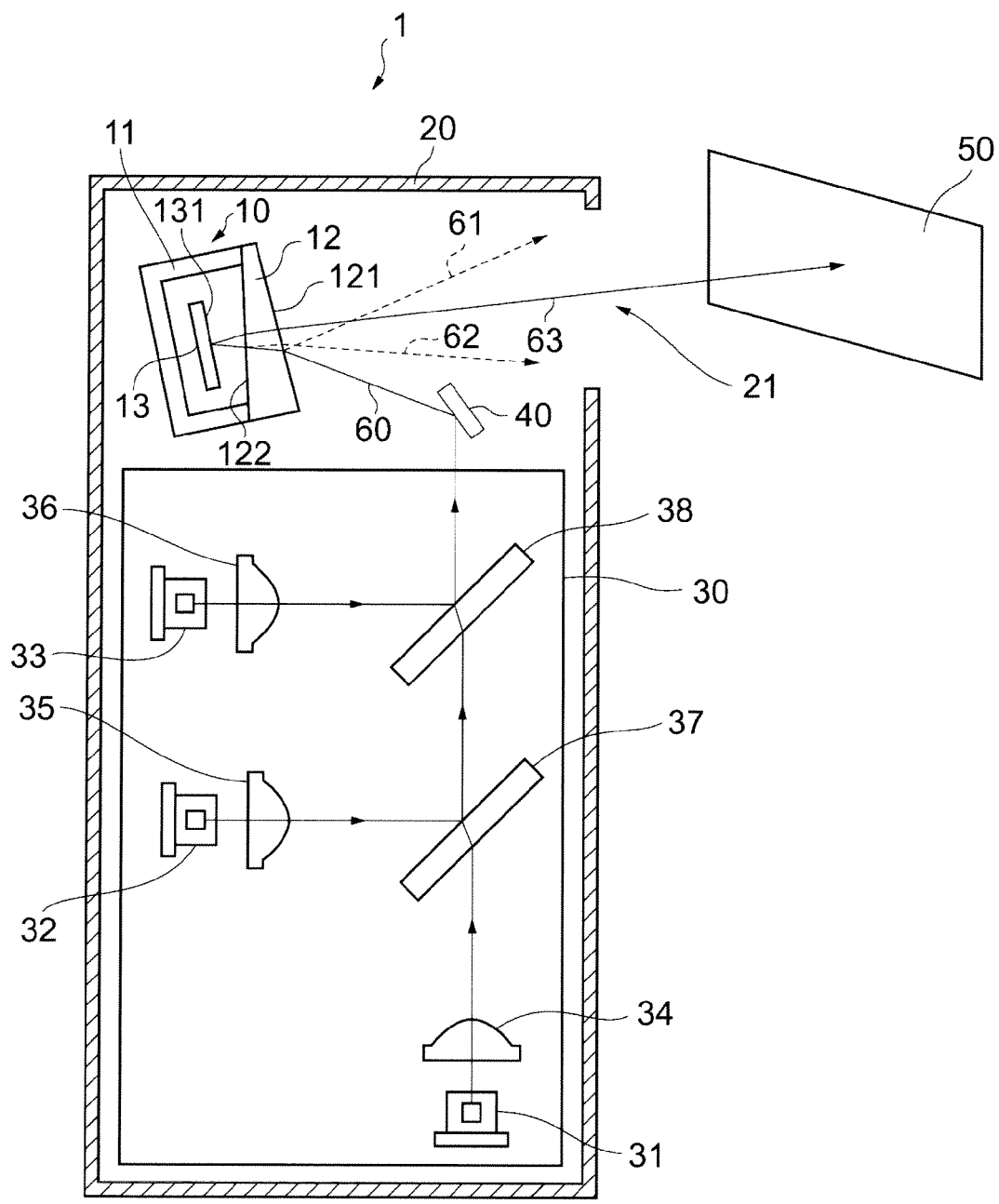
FIG. 1 is a perspective diagram for illustrating the entire configuration of an image display apparatus including an optical scanning unit according to a first embodiment of the present invention.

In FIG. 1, a reference numeral 1 denotes, as a whole, an image display apparatus including an optical scanning unit 10 according to a first embodiment of the present invention. The image display apparatus 1 is constituted by including a light-source unit 30, a reflection mirror 40, and the optical scanning unit 10 inside an image display apparatus' housing (which, hereinafter, will be referred to as "display-apparatus housing") 20. This display-apparatus housing 20 forms an outer frame of the image display apparatus, and is equipped with an aperture portion 21. Here, a light beam that is scanned by the optical scanning unit 10 onto a screen 50 or the like is so guided as to pass through this aperture portion 21.

First, the explanation will be given below concerning the light-source unit 30. The light-source unit 30 includes a first laser light-source 31, a second laser light-source 32, a third laser light-source 33, a first collimator lens 34, a second collimator lens 35, a third collimator lens 36, a first light-superposing element 37, and a second light-superposing element 38.

The first laser light-source 31 is constituted from, e.g., a semiconductor laser for emitting a 520-nm-band's green-colored (Green) light beam. The green-colored light beam emitted from the first laser light-source 31 is converted into a parallel light beam or a weakly-converged light beam by the first collimator lens 34. Incidentally, the laser light-source that is applicable as the first laser light-source 31 is a SHG laser light-source where the second-order harmonics wave is used.

Also, the second laser light-source 32 is constituted from, e.g., a semiconductor laser for emitting a 640-nm-band's red-colored (Red) light beam. The red-colored light beam emitted from the second laser light-source 32 is converted into a parallel light beam or a weakly-converged light beam by the second collimator lens 35.

Moreover, the third laser light-source 33 is constituted from, e.g., a semiconductor laser for emitting a 455-nm-band's blue-colored (Blue) light beam. The blue-colored light beam emitted from the third laser light-source 33 is converted into a parallel light beam or a weakly-converged light beam by the third collimator lens 36.

The first light-superposing element 37 is constituted from, e.g., a wavelength-selective mirror for permitting the green-colored light beam to transmit therethrough, and reflecting the red-colored light beam. The first light-superposing element 37 makes an adjustment of causing the optical axes of the green-colored light beam and the red-colored light beam to substantially coincide with each other.

The second light-superposing element 38 is constituted from, e.g., a wavelength-selective mirror for permitting the green-colored light beam and the red-colored light beam to transmit therethrough, and reflecting the blue-colored light beam. The second light-superposing element 38 makes an adjustment of causing the optical axes of the blue-colored light beam, the green-colored light beam, and the red-colored light beam to substantially coincide with each other.

The light beams emitted from the first to third laser light-sources 31 to 33 pass through the first light-superposing element 37, and the second light-superposing element 38. This passing-through superposes the light beams into a light beam 60 where the respective optical axes are caused to substantially coincide with each other. Hereinafter, this process will be omitted that the light beams are emitted from the first to third laser light-sources 31 to 33, and become the light beam 60 where the optical axes substantially coincide with each other. Instead, the description will be given as "the light beam 60 is emitted from the light-source unit 30 to the reflection mirror 40".

Incidentally, the light-source unit 30 where the first to third laser light-sources 31 to 33 are used is an example of the light-source unit 30 that constitutes the image display apparatus 1. Namely, the light-source unit 30 is not limited to this example.

The reflection mirror 40 is a mirror for reflecting the light beam 60 emitted from the light-source unit 30. The light beam 60, which is emitted from the light-source unit 30 and is reflected by the reflection mirror 40, becomes an incident light which is travelling toward the optical scanning unit 10.

Next, the explanation will be given below concerning the optical scanning unit 10.

The optical scanning unit 10 is, e.g., a MEMS housing. As illustrated in FIG. 1, the optical scanning unit 10 is of the following sealing structure: Namely, a space is formed inside the optical scanning unit 10 by a scanning-unit housing 11 and a light-transmissive cover 12 that is bonded to this scanning-unit housing 11. Moreover, a rotationally-moving mirror 13 is fixed inside this sealing structure in a rotationally-movable manner.

The rotationally-moving mirror 13, which is implemented by, e.g., a MEMS mirror, is capable of rotationally moving at a predetermined angle from its neutral state. FIG. 1 illustrates the rotationally-moving mirror 13 that lies in its neutral state. The rotationally-moving mirror 13 is equipped with a reflection plane 131 for reflecting the light beam 60, which is emitted from the light-source unit 30, into the direction of the screen 50. The rotationally-moving mirror 13 adjusts the reflection direction of the light beam 60 by rotationally moving, thereby two-dimensionally scanning the light beam 60 over the screen 50. Furthermore, an afterimage effect of this two-dimensionally scanned light beam allows the image to be displayed on the screen 50.

Incidentally, the rotationally-moving mirror 13 is controlled in its driving velocity and rotation angle by, e.g., a (not-illustrated) MEMS-mirror scanner. In order to make the explanation simple, however, the description will be given as "the rotationally-moving mirror 13 rotationally moves". Also, the rotationally-moving mirror 13 allows the implementation of the two-dimensional scanning on the basis of its movements in the tilting direction and the rotation direction. Hereinafter, in order to make the explanation simple, the explanation will be given in a manner of restricting these movements to the tilting-direction movement alone. This restricted manner of explanation, however, does not limit the rotation-direction movement performed by the rotationally-moving mirror 13.

The light-transmissive cover 12, which is a member formed of a light-transmissive material such as a glass plate, is provided between the rotationally-moving mirror 13 and the reflection mirror 40. In the light-transmissive cover 12, a first plane (i.e., external plane) 121 of the light-transmissive cover 12 on the side of the reflection mirror 40, and a second plane (i.e., internal plane) 122 of the light-transmissive cover 12 on the side of the rotationally-moving mirror 13 are formed into a relationship of being not parallel to each other (i.e., non-parallel relationship). For example, the cross-section of the light-transmissive cover 12 illustrated in FIG. 1 is formed into a wedge-like profile whose upper-edge width is shorter than whose lower-edge width. Moreover, each of the external plane 121 and the internal plane 122 of the light-transmissive cover 12 is so provided as to become non-parallel to the reflection plane 131 of the rotationally-moving mirror 13 that rotationally moves.

In the optical scanning unit 10, first, the light beam 60, which is emitted from the light-source unit 30 and is reflected by the reflection mirror 40, is transmitting through the light-transmissive cover 12 as the incident light. At this time, a partial light beam of the light beam 60 is reflected by the external plane 121, thereby traveling toward the outside of the optical scanning unit 10 (i.e., first reflected light 61). Also, a partial light of the light that has passed through the inside of the light-transmissive cover 12 is reflected by the internal plane 122, thereby traveling toward the outside of the optical scanning unit 10 (i.e., second reflected light 62).

Moreover, the light beam 60 that has passed through the light-transmissive cover 12 is reflected by the reflection plane 131 of the rotationally-moving mirror 13. Furthermore, the light beam 60, which is reflected by the reflection plane 131 of the rotationally-moving mirror 13, transmits through the light-transmissive cover 12 again, then traveling into the direction of the screen 50 that is positioned at the outside of the optical scanning unit 10 (i.e., third reflected light 63).

Figure 2:
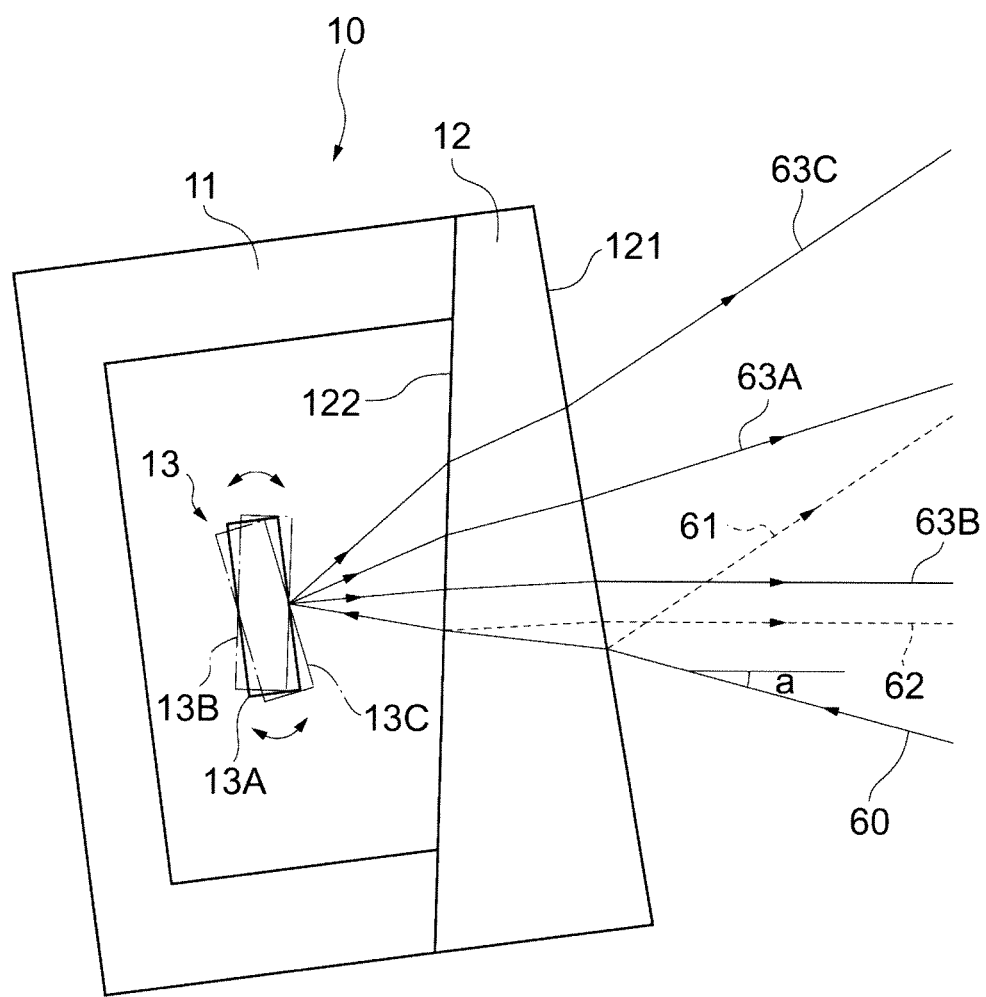
FIG. 2 is a perspective diagram for illustrating the trajectories of a light beam corresponding to the rotationally-moving states of a rotationally-moving mirror.

FIG. 2 illustrates the trajectories of the light beam 60 corresponding to the rotationally-moving states of the rotationally-moving mirror 13. Regarding the light beam 60 that is entering the light-transmissive cover 12 from the laser light-source unit 30, the incident angle with reference to the horizontal direction is defined as an incident angle a. A rotationally-moving mirror 13A lies in its neutral state; whereas rotationally-moving mirrors 13B and 13C lie in their states where the mirrors 13B and 13C have rotationally moved into the tilting directions with their maximum oscillation angle.

Third reflected lights 63A to 63C illustrated in FIG. 2 are the third reflected lights 63 corresponding to the rotationally-moving mirrors 13A to 13C that lie in the mutually different rotationally-moving states. The third reflected light 63A is equivalent to the third reflected light 63 which is reflected by the rotationally-moving mirror 13A. The third reflected light 63B is equivalent to the third reflected light 63 which is reflected by the rotationally-moving mirror 13B that lies in its state where the mirror 13B has rotationally moved into the downwardly-tilting direction with its maximum oscillation angle. The third reflected light 63C is equivalent to the third reflected light 63 which is reflected by the rotationally-moving mirror 13C that lies in its state where the mirror 13C has rotationally moved into the upwardly-tilting direction with its maximum oscillation angle.

Also, in FIG. 2, the reflected lights (i.e., the first reflected light 61 and the second reflected light 62) that are reflected by the external plane 121 and the internal plane 122 of the light-transmissive cover 12 are denoted by the dashed lines. Also, when the light beam 60 transmits through the light-transmissive cover 12, its optical path refracts in accordance with the incident angle of the light beam 60 and the refractive index of the light-transmissive cover 12.

In the optical scanning unit 10 like this, the inclinations of the external plane 121 and the internal plane 122 of the light-transmissive cover 12 are determined so that the first reflected light 61 and the second reflected light 62 reach areas that are different from the image-projected area onto which an image is projected by the third reflected light 63. Incidentally, in the optical scanning unit 10, the first reflected light 61 and the second reflected light 62 are also allowed to reach a boundary portion of the image-projected area onto which an image is projected by the third reflected light 63.

Figure 3:
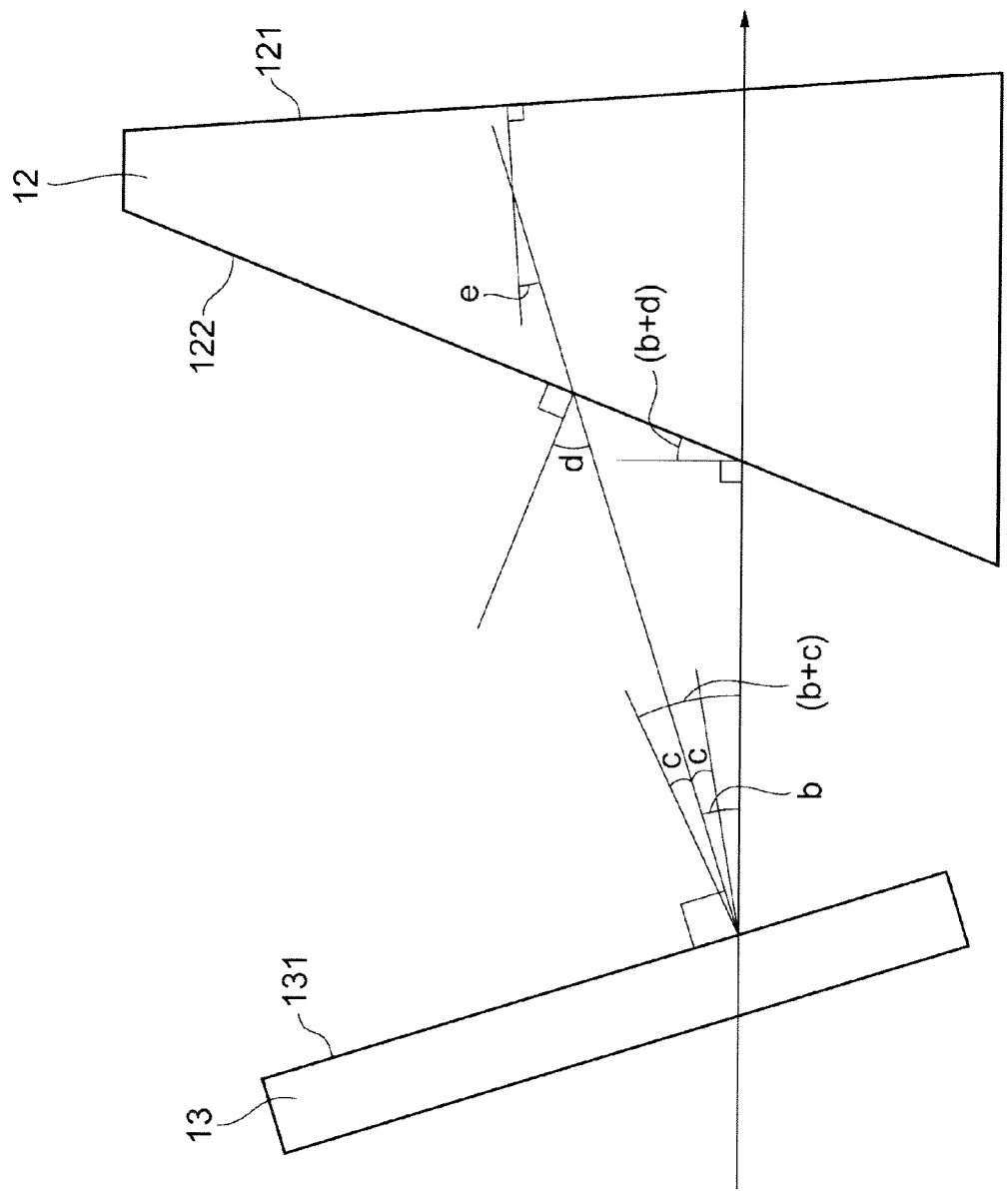
FIG. 3 is an explanatory diagram for explaining various types of angles.

Here, the explanation will be given below regarding an example of the method for determining the inclinations of the external plane 121 and the internal plane 122 of the light-transmissive cover 12. FIG. 3 illustrates various types of angles that are formed by the rotationally-moving mirror 13, the light-transmissive cover 12, and the light beam 60.

As illustrated in FIG. 3, the inclination angle that a normal line of the rotationally-moving mirror 13 in its neutral state forms with the horizontal axis is defined as a neutral inclination angle b. Moreover, the maximum oscillation angle that is oscillated from the neutral inclination angle b by the rotationally-moving mirror 13 is defined as an oscillation angle c. Namely, the rotationally-moving mirror 13 rotationally moves in accompaniment with an inclination angle that ranges from (b−c) to (b+c) with the horizontal axis employed as its criterion.

As described earlier, the external plane 121 and the internal plane 122 of the light-transmissive cover 12 are non-parallel to each other. Accordingly, the angle that the external plane 121 forms with reference to the reflection plane 131 of the rotationally-moving mirror 13, and the angle that the internal plane 122 forms with reference thereto are different from each other. Here, the angle that a normal line of the internal plane 122 of the light-transmissive cover 12 and the neutral inclination angle b form with each other is defined as a relative inclination angle d. At this time, the absolute inclination angle that the internal plane 122 forms is represented by (d−b) with the vertical axis employed as its criterion.

The relative inclination angle d is set so that (d−b) becomes equal to or larger than (c−b). Here, (b+d) indicates the absolute inclination angle of the internal plane 122 of the light-transmissive cover 12, and (b+c) indicates the angle at the time when the rotationally-moving mirror 13 has inclined most. At this time, the relationships given by the following Expression (1) and Expression (2) hold among the neutral inclination angle b, the oscillation angle c, and the relative inclination angle d: Incidentally, when the equalities hold in the Expression (1) and Expression (2), the second reflected light 62 is projected onto the lower side of the image-displayed area of an image that is scanned over the screen 50 by the third reflected light 63.

[Expression 1]

$$(d-b) \geq (c-b) \tag{1}$$

[Expression 2]

$$d \geq c \tag{2}$$

Also, the angle that a normal line of the external plane 121 of the light-transmissive cover 12 and the neutral inclination angle b form with each other is defined as a relative inclination angle e. The relative inclination angle e is set so that the relationships given by the following Expression (3) to Expression (11) are satisfied, using parametric angles f, g, h, i, j, k, l, and m: A reference notation n indicates the refractive index of the light-transmissive cover 12. Incidentally, when the equality holds in the Expression (11), the first reflected light 61 is projected onto the upper side of the image-displayed area of the image that is scanned over the screen 50 by the third reflected light 63.

[Expression 3]

$$\sin(a+b-e)/\sin(f)=n \tag{3}$$

[Expression 4]

$$\sin(g)/\sin(f+e-d)=n \tag{4}$$

[Expression 5]

$$h=g+d+c \tag{5}$$

[Expression 6]

$$\sin(-h-c-d)/\sin(i)=n \tag{6}$$

[Expression 7]

$$\sin(j)/\sin(i+d-e)=n \tag{7}$$

[Expression 8]

$$k=j-b+e \tag{8}$$

[Expression 9]

$$l=-a-b+e \tag{9}$$

[Expression 10]

$$m = l - b + e \quad (10)$$

[Expression 11]

$$m \leq k \quad (11)$$

Incidentally, in FIG. 2 and FIG. 3, the incident angle a, the neutral inclination angle b, the oscillation angle c, the relative inclination angle d, and the relative inclination angle e are designated assuming the direction shown in FIG. 3 is positive.

Here, the Expression (3) shows the relation between the incident angle and refractive angle (Snell's law) when the light beam 60 enters into the light-transmissive cover 12. The Expression (4) shows the relation between the incident angle and refractive angle (Snell's law) when the light beam 60 which transmitted through the light-transmissive cover 12 goes from the light-transmissive cover 12. The Expression (5) shows the relation between the incident angle and refractive angle of light beam at the rotationally-moving mirror 13. The Expression (6) shows the relation between the incident angle and refractive angle (Snell's law) when the light beam which is reflected at the rotationally-moving mirror 13 re-enters into the light-transmissive cover 12. The Expression (7) shows the relation between the incident angle and refractive angle (Snell's law) when the reflected light of the light beam which transmitted through the light-transmissive cover 12 goes from the light-transmissive cover 12. The Expression (8) shows the absolute output angle of the reflected light. The Expression (10) shows the absolute output angle of the reflected light when the light beam 60 enters into the light-transmissive cover 12.

The inclinations of the external plane 121 and the internal plane 122 of the light-transmissive cover 12 are set so that the relationships given by the above-described Expression (1) to Expression (11) are satisfied. This setting makes it possible to implement the above-described optical scanning unit 10: Namely, this optical scanning unit 10 causes the first reflected light 61 and the second reflected light 62 to reach the areas that are different from the image-projected area onto which an image is projected by the third reflected light 63.

Here, an example (i.e., first application example) will be specified where concrete numerical values are applied to the above-described various types of angles a to e and the refractive index n. Each numerical value can be set by an automatic design using computer-based light-rays tracking calculations.

First, the numerical values are set as follows: $a = +15.000°$, $b = +7.415°$, $c = +9.000°$, and $d = +9.000°$.

At this time, the value of $(d-b)$ and the value of $(c-b)$ become equal to $+1.585°$ and $+1.585°$, respectively. Namely, $(d-b) = (c-b)$ holds, which means that the relationship given by the Expression (1) (: $(d-b) \geq (c-b)$) is satisfied. Incidentally, although quite natural, $c = d$ holds. Accordingly, c and d satisfy the relationship given by the Expression (2) (: $d \geq c$).

Next, the remaining numerical values are set as follows: $e = -2.058°$, and $n = 1.51431$.

At this time, calculating f from the relationship given by the Expression (3) (: $\sin(a+b-e)/\sin(f) = n$) results in $f = +15.877°$. In addition, calculating g from the relationship given by the Expression (4) (: $\sin(g)/\sin(f+e-d) = n$) results in $g = +7.309°$.

Moreover, calculating h from the relationship given by the Expression (5) (: $h = g + d + c$) results in $h = +25.309°$. In addition, calculating i from the relationship given by the Expression (6) (: $\sin(-h-c-d)/\sin(i) = n$) results in $i = -26.934°$. In addition, calculating j from the relationship given by the Expression (7) (: $\sin(j)/\sin(i+d-e) = n$) results in $j = -24.472°$.

Furthermore, calculating k from the relationship given by the Expression (8) (: $k = j - b + e$) results in $k = -33.945°$. In addition, calculating l from the relationship given by the Expression (9) (: $l = -a - b + e$) results in $l = -24.473°$. Finally, calculating m from the relationship given by the Expression (10) (: $m = l - b + e$) results in $m = -33.946°$. At this time, from the above-described calculation results, the comparison is made as to the large-or-small relationship between m and k. This comparison shows that m and k satisfy the relationship given by the Expression (11) (: $m \leq k$).

Accordingly, it can be confirmed that there actually exist the numerical values which satisfy the relationships given by the Expression (1) to Expression (11). Consequently, it has been confirmed that the optical scanning unit 10 in the first embodiment is implementable.

Figure 4:
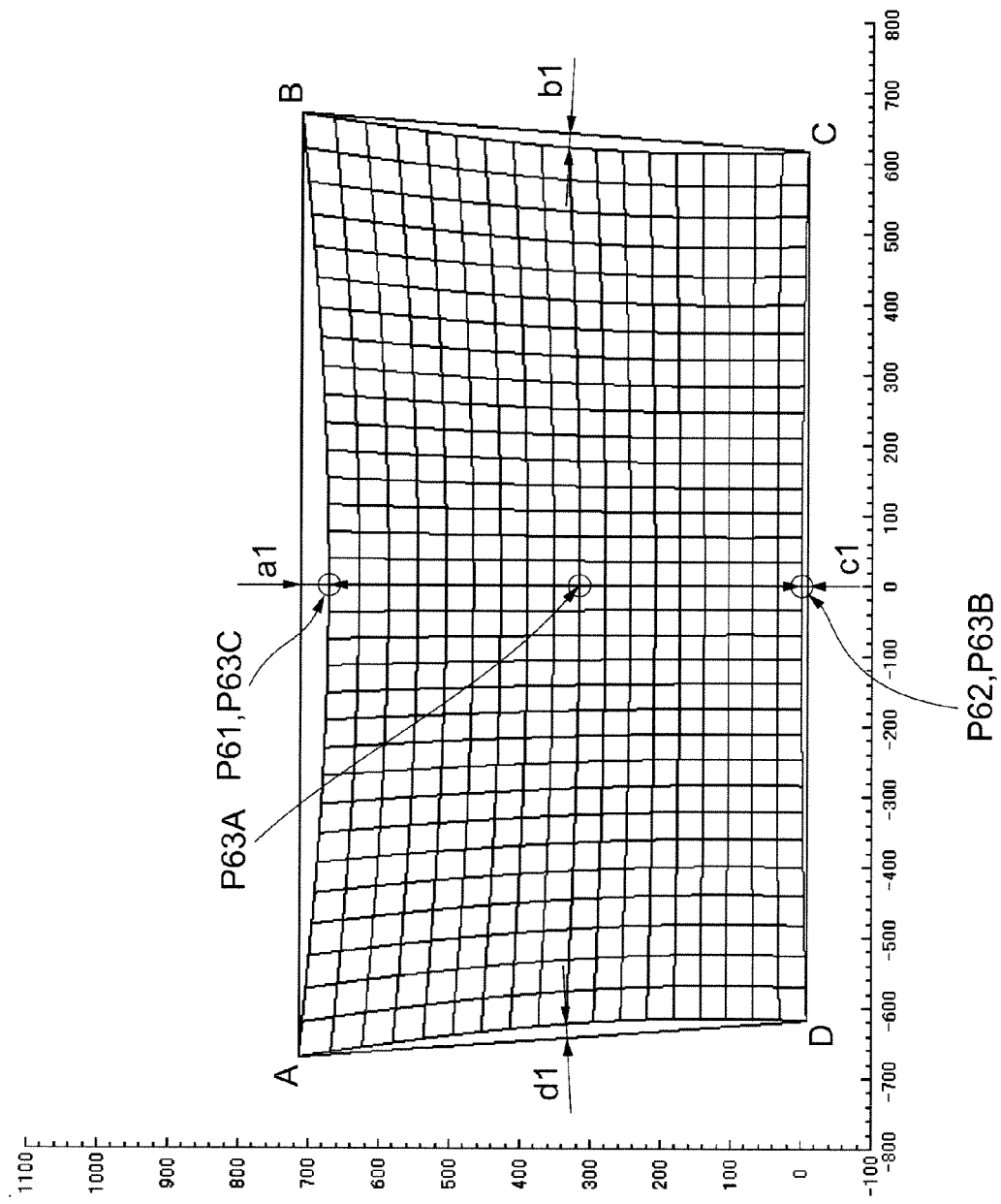
FIG. 4 is a diagram for illustrating an example of the display result of a lattice-like image displayed by the image display apparatus.

FIG. 4 illustrates the display result of a lattice-like image which is displayed by the image display apparatus 1 in the first application example. As illustrated in FIG. 4, the lattice-like image is projected onto the screen in a manner of being accompanied by distortions. The trapezoid distortions and the pincushion-shaped distortions are caused to occur on the lattice-like image illustrated in FIG. 4. Incidentally, the distance ranging from the optical scanning unit 10 to the screen 50 has been set at, e.g., 1000 mm. This distance remains basically the same in FIG. 6, FIG. 8, and FIG. 10 which will be described later.

Incidentally, the reference notations P61 and P62 illustrated in FIG. 4 indicate the reach points of the first reflected light 61 and the second reflected light 62. Also, the reference notations P63A, P63B, and P63C indicate the reach points of the third reflected lights 63A, 63B, and 63C. The positions of P61 and P62 illustrated in FIG. 4 make it possible to confirm that the first reflected light 61 and the second reflected light 62 have not mixed into the image-displayed area over which the image is displayed by the third reflected lights 63A, 63B, and 63C. Additionally, in FIG. 6, FIG. 8, and FIG. 10 which will be described later, the reach points P61 and P62, and P63A, P63B, and P63C on the screen 50 will also be indicated as is the case with FIG. 4.

Next, the explanation will be given below concerning the distortions which are caused to occur on the lattice-like image displayed.

The extents of the distortions of the image can be calculated by various calculation methods. Here, as an example, using a calculation method which is given by the following Expression (12) to Expression (17), the horizontal trapezoid distortion TH, the vertical trapezoid distortion TV, the upper-side distortion T1, the lower-side distortion B1, the left-side distortion L1, and the right-side distortion R1 have been calculated. Incidentally, each of AD, BC, AB, and DC is equivalent to the length of each side of the rectangle obtained by connecting the vertexes of the displayed lattice-like image to each other. Also, each of the reference notations a1, b1, c1, and d1 indicates the distance ranging from each side of the rectangle to the most-distorted point (i.e., peak). This distance is assumed to be positive if the peak exists outside each side of the rectangle; and negative if the peak exists inside each side thereof. Furthermore, each of the calculated values of T1, B1, L1, and R1 indicates the pincushion-shaped distortion if it is negative; and a barrel-shaped distortion if it is positive.

[Expression 12]

$$TH(\%) = (AD - BC)/(AD + BC) \times 100 \quad (12)$$

[Expression 13]

$$TV(\%)=(AB-DC)/(AB+DC)\times 100 \qquad (13)$$

[Expression 14]

$$T1(\%)=4\times a1/(AD+BC)\times 100 \qquad (14)$$

[Expression 15]

$$B1(\%)=4\times c1/(AD+BC)\times 100 \qquad (15)$$

[Expression 16]

$$L1(\%)=4\times d1/(AB+DC)\times 100 \qquad (16)$$

[Expression 17]

$$R1(\%)=4\times b1/(AB+DC)\times 100 \qquad (17)$$

With respect to the first application example, the extents of the distortions are calculated in accordance with the calculation method given by the Expression (12) to Expression (17). The calculation results of the extents are as follows: TH=0.0%, TV=+4.1%, T1=−11.1%, B1=−2.1%, L1=−3.1%, and R1=−3.1%.

Next, these extents of the distortions are compared with the extents of distortions which are caused to occur on the lattice-like image that is displayed by a conventional optical scanning unit.

Figure 5:
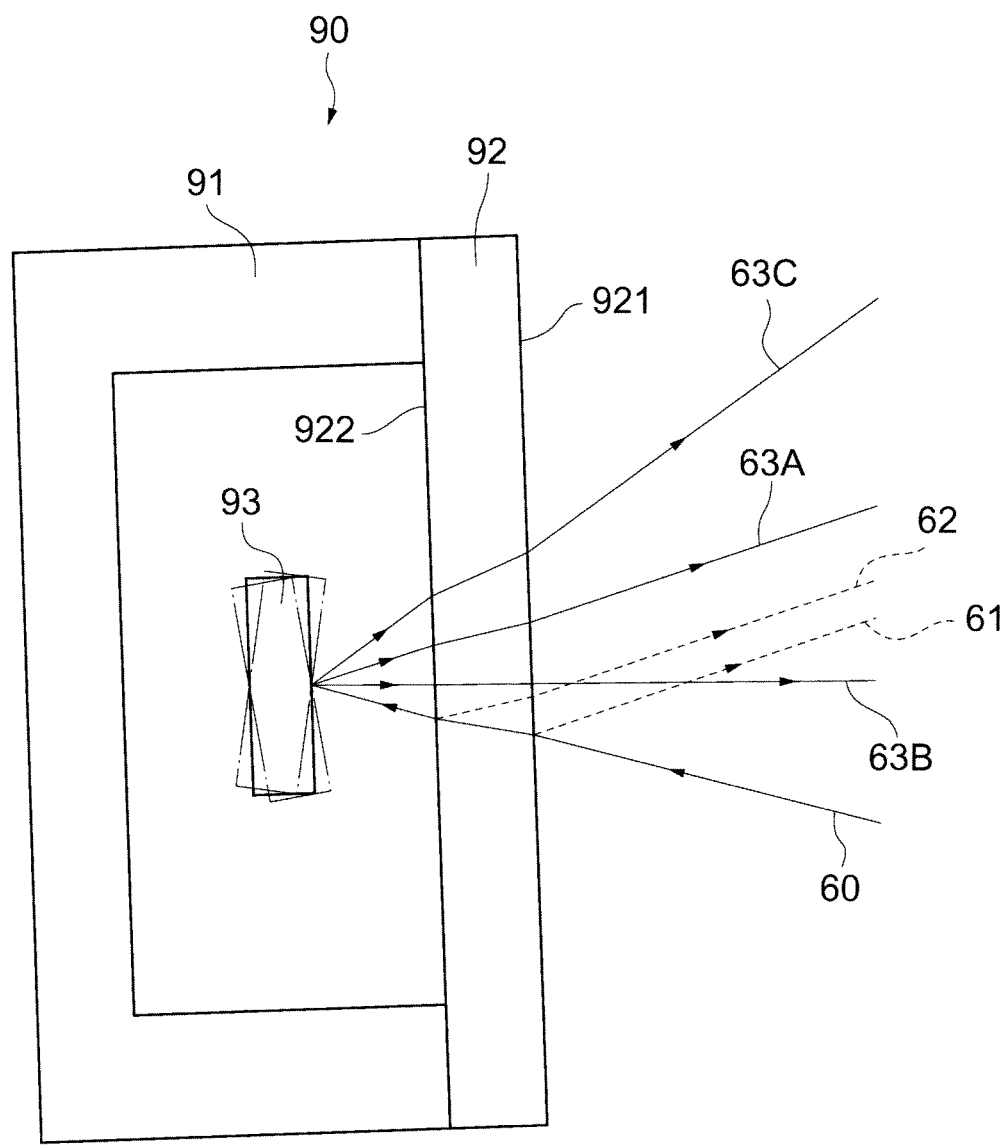
FIG. 5 is a perspective diagram for illustrating a configuration example of a conventional optical scanning unit.

FIG. 5 illustrates a configuration example of the conventional optical scanning unit 90. In the conventional optical scanning unit 90, an external plane 921 and an internal plane 922 of a light-transmissive cover 92 are so formed as to become parallel to a rotationally-moving mirror 93 in its neutral state. Excluding the profile and deployment of the light-transmissive cover 92, the configuration of the conventional optical scanning unit 90 is basically the same as that of the optical scanning unit 10 in the first embodiment illustrated in FIG. 1. Accordingly, the explanation of the configuration of the unit 90 will be omitted here.

First, with respect to the various types of angles in the conventional optical scanning unit 90, the numerical values are set as follows: a=+15.000°, b=+1.500°, c=+9.000°, and d=+0.000°. At this time, the value of (d−b) and the value of (c−b) become equal to −1.500° and +7.500°, respectively. Namely, (d−b)<(c−b) holds, which means that the relationship given by the Expression (1) is not satisfied. Also, since d<c holds, the relationship given by the Expression (2) is not satisfied, either.

Next, the remaining numerical values are set as follows: e=−0.000°, and n=1.51431. At this time, the values of the parameters f to m are calculated based on the relationships given by the Expression (3) to Expression (10). The calculation results of the parameters are as follows: f=+10.810°, g=+16.500°, h=+25.500°, i=−21.965°, j=−34.500°, k=−36.000°, l=−16.500°, and m=−18.000°. At this time, from the above-described calculation results, the comparison is made as to the large-or-small relationship between m and k. This comparison shows that m>k holds. Namely, m and k do not satisfy the relationship given by the Expression (11) (: m≤k).

Figure 6:
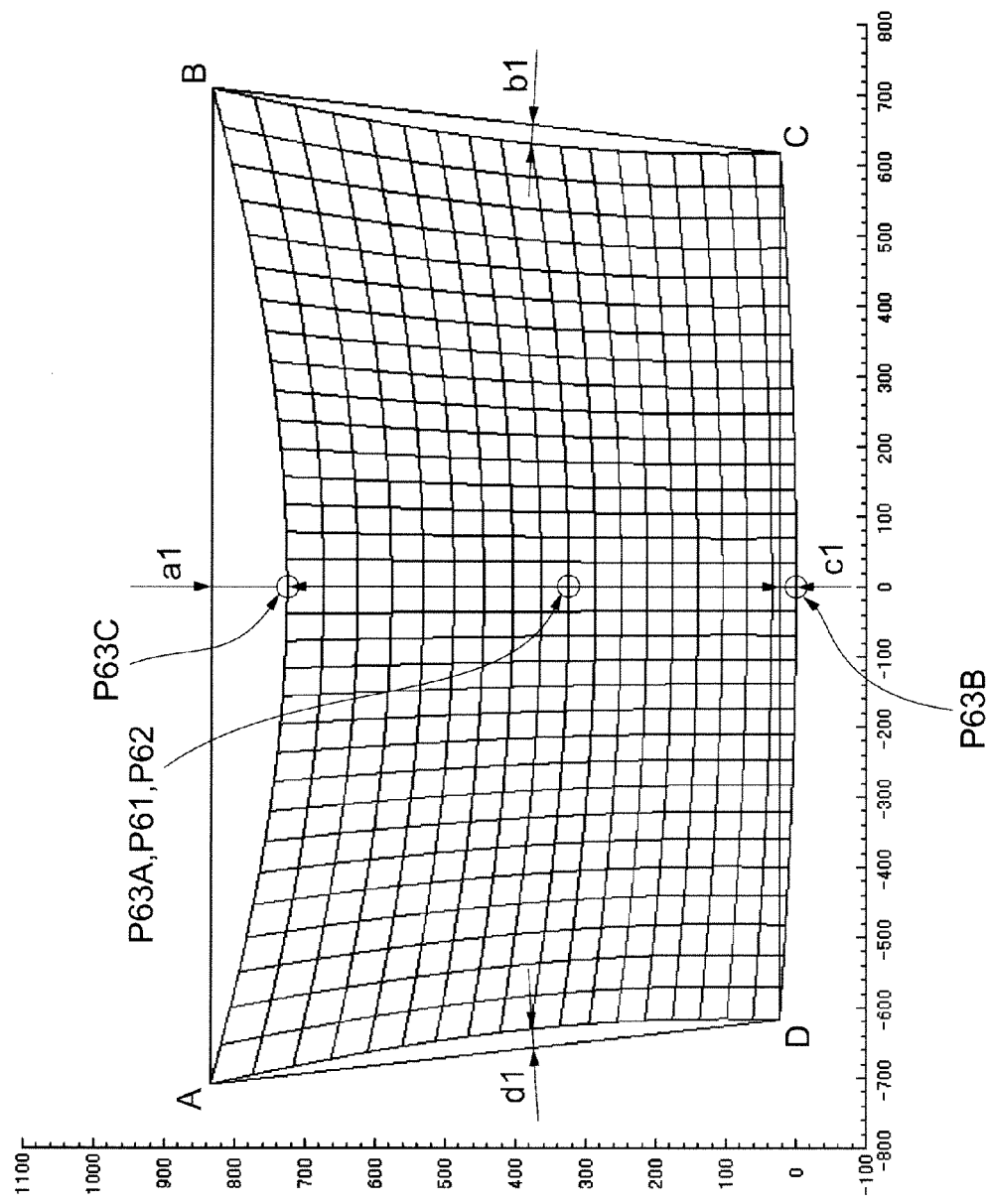
FIG. 6 is a diagram for illustrating an example of the display result of the lattice-like image displayed by the conventional image display apparatus.

FIG. 6 illustrates the display result of the lattice-like image that is displayed by the conventional image display apparatus 90 to which the above-described numerical-value condition is applied. In FIG. 6, P61 and P62 coincide with P63A. This situation shows that the first reflected light 61 and the second reflected light 62 have mixed into the image-displayed area.

Next, with respect to the lattice-like image illustrated in FIG. 6, the extents of the distortions are calculated in accordance with the calculation method given by the Expression (12) to Expression (17). The calculation results of the extents are as follows: TH=0.0%, TV=+6.9%, T1=−26.5%, B1=+5.7%, L1=−4.0%, and R1=−4.0%.

At this time, the absolute values of the vertical trapezoid distortion TV, the upper-side distortion T1, the lower-side distortion B1, the left-side distortion L1, and the right-side distortion R1 are larger than those calculated in the case of the first application example. Namely, the extents of the distortions in the conventional optical scanning unit 90 have become larger than the extents of the distortions in the first application example. Accordingly, according to the optical scanning unit 10 in the first embodiment, as compared with the conventional optical scanning unit 90, it can be expected to exhibit an effect of improving the distortions occurring on the image without performing a special image-distortion correction processing.

In this way, according to the optical scanning unit 10 in the first embodiment, the first reflected light 61 and the second reflected light 62 reach the areas that are different from the image-projected area onto which an image is projected by the third reflected light 63. As a result, it can be expected to exhibit an effect of preventing the first reflected light 61 and the second reflected light 62 from mixing into the image-projected area, and of preventing the lowering in the displayed picture quality.

Also, according to the optical scanning unit 10 like this, the sealing structure is formed by the scanning-unit housing 11 and the light-transmissive cover 12. Consequently, the rotationally-moving mirror 13 can be deployed inside the sealing structure that is maintained at a low pressure or maintained into a vacuum state. The rotationally-moving mirror 13 deployed in this manner undergoes a less air resistance at the time of its rotational movement. On account of this condition, it can be expected to exhibit an effect of suppressing the heat-liberation amount generated in accompaniment with the rotational movement of the rotationally-moving mirror 13. Also, the higher frequency can also be used for the rotational movement of the rotationally-moving mirror 13 while suppressing the heat-liberation amount within a conventional heat-liberation-amount range. In this case, an enhancement in the scanning speed of the optical scanning unit 10 allows the expectation of an enhancement in the displayed picture quality. Incidentally, these effects based on this sealing structure can also be expected similarly in an optical scanning unit 70 according to a second embodiment and an image display apparatus 2 according to a third embodiment (, both of which will be described later).

(2) 2nd Embodiment

Figure 7:
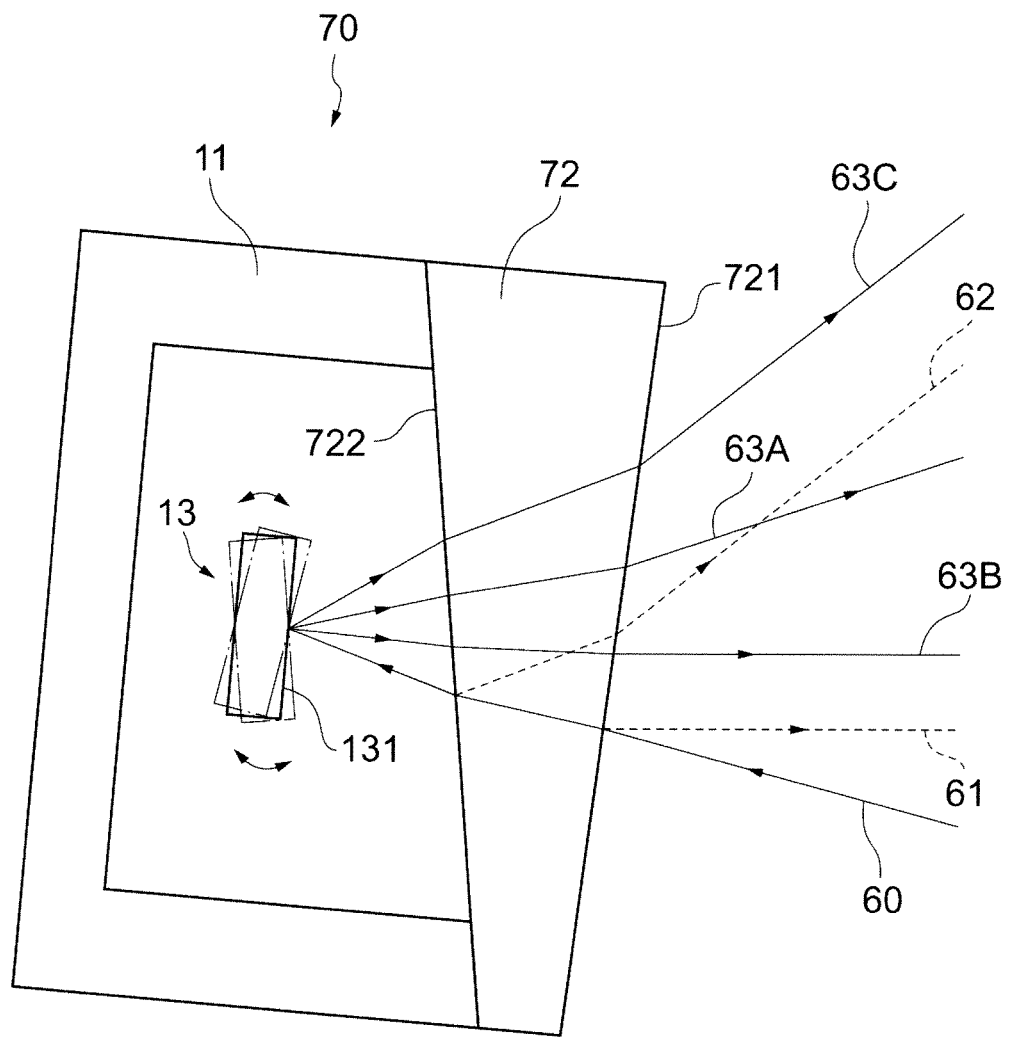
FIG. 7 is a perspective diagram for illustrating a configuration example of the optical scanning unit according to a second embodiment of the present invention.

FIG. 7 illustrates a configuration example of the optical scanning unit 70 according to the second embodiment. Excluding a light-transmissive cover 72, configuration components of the optical scanning unit 70 are the same as those of the optical scanning unit 10. Accordingly, the explanation thereof will be omitted here.

As is the case with the light-transmissive cover 12 in the first embodiment, the light-transmissive cover 72 is so provided as to be deployed as follows: Namely, an external plane 721 and an internal plane 722 of the light-transmissive cover 72 are made non-parallel to each other. In addition, the external plane 721 and the internal plane 722 are also made non-parallel to the reflection plane 131 of the rotationally-moving mirror 13. Furthermore, the inclinations of the external plane 721 and the internal plane 722 of the light-transmissive cover 72 are determined so that the first reflected light 61 and the second reflected light 62 reach the areas that are different from the image-projected area onto which an image is projected by the third reflected light 63 (which includes 63A, 63B, and 63C).

Here, in the second embodiment, the light-transmissive cover 72 is formed in such a manner that its upper-edge width is longer than its lower-edge width. In the optical scanning unit 70 which includes the light-transmissive cover 72 like this, the angle of the external plane 721 with reference to the incident light is different from the one in the first embodiment. As a result, the reflection directions of the first reflected light 61 and the second reflected light 62 turn out to be different from the reflection directions of the first reflected light 61 and the second reflected light 62 illustrated in FIG. 2.

Consequently, in FIG. 2, it is just all right if, for example, the first reflected light 61 travels into a direction which is positioned over the third reflected light 63. In FIG. 7, however, the first reflected light 61 is required to travel into a direction which is positioned under the third reflected light 63. Also, in FIG. 2, it is just all right if the second reflected light 62 travels into a direction which is positioned under the third reflected light 63. In FIG. 7, however, the second reflected light 62 is required to travel into a direction which is positioned over the third reflected light 63.

Based on the point-of-view like this, the following Expression (18) to Expression (28) will be used as an example of the method for determining the inclinations of the external plane 721 and the internal plane 722 of the light-transmissive cover 72 in the second embodiment.

[Expression 18]

$$(d-b) \le (-c-b) \tag{18}$$

[Expression 19]

$$d \le -c \tag{19}$$

[Expression 20]

$$\sin(a+b-e)/\sin(f) = n \tag{20}$$

[Expression 21]

$$\sin(g)/\sin(f+e-d) = n \tag{21}$$

[Expression 22]

$$h = g + d - c \tag{22}$$

[Expression 23]

$$\sin(-h+c-d)/\sin(i) = n \tag{23}$$

[Expression 24]

$$\sin(j)/\sin(i+d-e) = n \tag{24}$$

[Expression 25]

$$k = j - b + e \tag{25}$$

[Expression 26]

$$l = -a - b + e \tag{26}$$

[Expression 27]

$$m = l - b + e \tag{27}$$

[Expression 28]

$$m \ge k \tag{28}$$

Additionally, when the equalities hold in the Expression (18) and Expression (19), the second reflected light 62 is projected onto the upper side of the image-displayed area of an image that is scanned over the screen 50 by the third reflected light 63C. Also, when the equality holds in the Expression (28), the first reflected light 61 is projected onto the lower side of the image-displayed area of the image that is scanned over the screen 50 by the third reflected light 63B.

Here, an example (i.e., second application example) will be specified where concrete numerical values are applied to the above-described various types of angles a to e and the refractive index n. It will be confirmed in this way that there actually exist the numerical values which satisfy the relationships given by the Expression (18) to Expression (28).

First, the numerical values are set as follows: a=+15.000°, b=−4.789°, c=+9.000°, and d=−9.000°.

At this time, the value of (d−b) and the value of (−c−b) become equal to −4.211° and −4.211°, respectively. Namely, (d−b) and (−c−b) satisfy the relationship given by the Expression (18). Also, −c and d satisfy the relationship given by the Expression (19).

Next, the remaining numerical values are set as follows: e=+2.711°, and n=1.51431.

At this time, the calculations where the Expression (20) to Expression (27) are used result in the following calculation results: f=+4.945°, g=+25.724°, h=+7.724°, i=+6.765°, j=−7.502°, k=−0.002°, l=−7.500°, and m=+0.000°. From the above-described calculation results, m≥k holds. This means that m and k satisfy the relationship given by the Expression (28).

Accordingly, it can be confirmed that there actually exist the numerical values which satisfy the relationships given by the Expression (18) to Expression (28). Consequently, it has been confirmed that the optical scanning unit 70 in the second embodiment is implementable.

Figure 8:
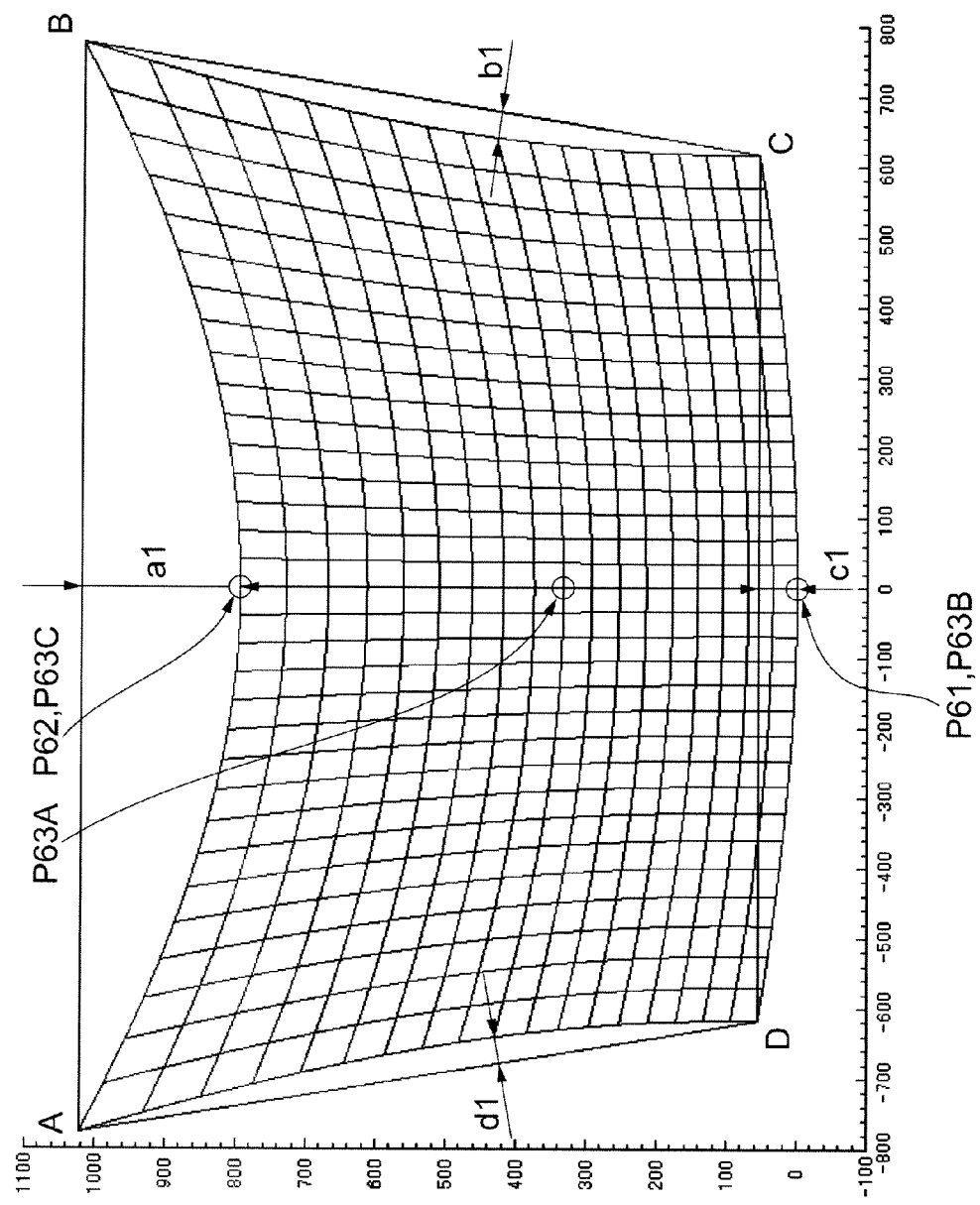
FIG. 8 is a diagram for illustrating an example of the display result of the lattice-like image displayed by the image display apparatus.

FIG. 8 illustrates the display result of a lattice-like image which is displayed by the image display apparatus 1 in the second application example. On the image illustrated in FIG. 8, the trapezoid distortions are caused to occur. Moreover, on the image illustrated in FIG. 8, the barrel-shaped distortion is caused to occur on the lower side, and the pincushion-shaped distortions are caused to occur on the other sides. Also, the positions of P61 and P62 illustrated in FIG. 8 make it possible to confirm that the first reflected light 61 and the second reflected light 62 have not mixed into the image-displayed area.

Next, as is the case with the first embodiment, using the calculation method given by the Expression (12) to Expression (17), the horizontal trapezoid distortion TH, the vertical trapezoid distortion TV, the upper-side distortion T1, the lower-side distortion B1, the left-side distortion L1, and the right-side distortion R1 have been calculated. The calculation results are as follows: TH=0.0%, TV=+11.4%, T1=−46.3%, B1=+11.4%, L1=−5.5%, and R1=−5.5%.

The above-described calculation results show that the second application example is lower than the first application example in its distortion-correcting effect.

According to the optical scanning unit 70 like this, even if the light-transmissive cover 72 is formed in such a manner that its upper-edge width is longer than its lower-edge width, the following effect can also be expected as is the case with the optical scanning unit 10 according to the first embodiment: Namely, it can be expected to exhibit the effect of preventing the first reflected light 61 and the second reflected light 62 from mixing into the image-projected area onto which an image is projected by the optical scanning unit 70, and of preventing the lowering in the displayed picture quality.

(3) 3rd Embodiment

Figure 9:
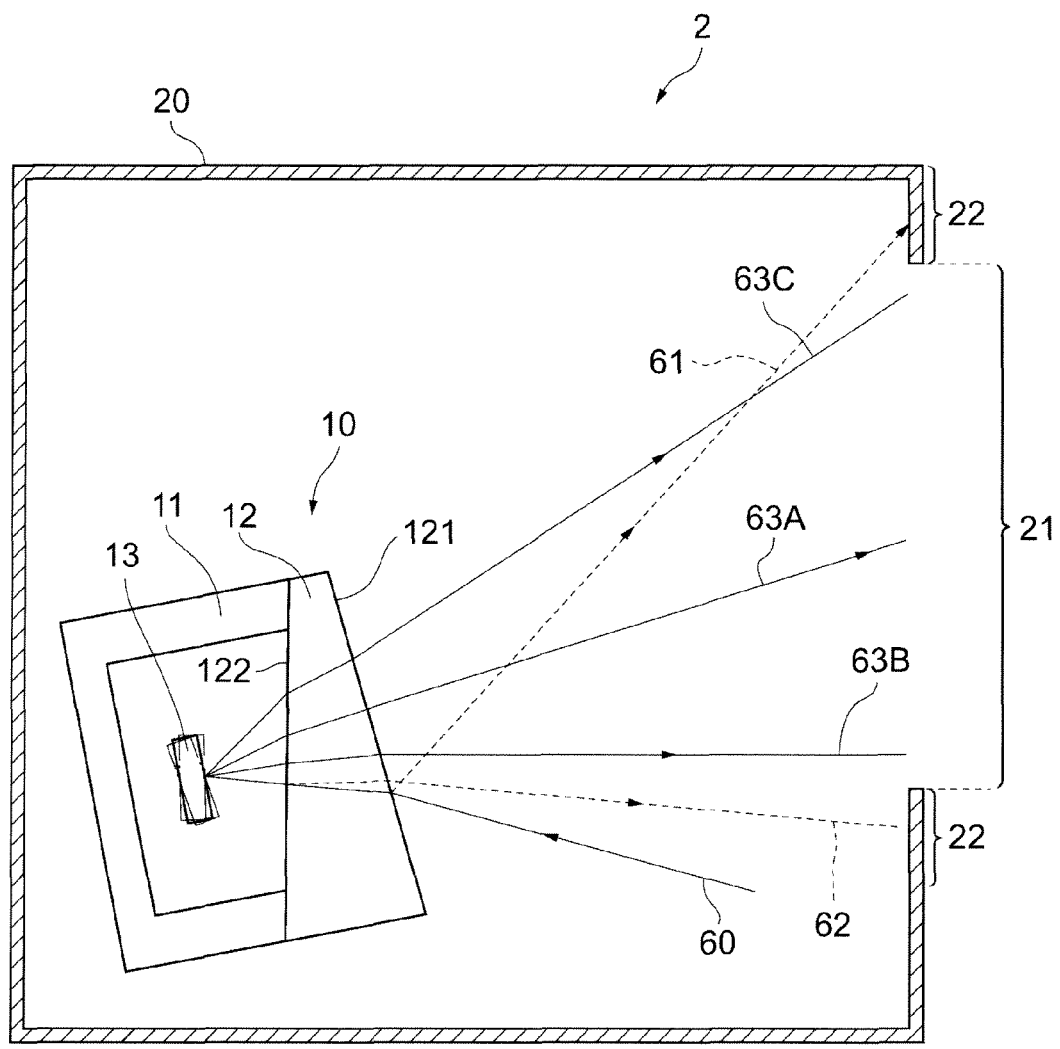
FIG. 9 is a perspective diagram for illustrating a configuration example of the image display apparatus according to a third embodiment of the present invention.

FIG. 9 illustrates a configuration example of the image display apparatus 2 according to the third embodiment. The configuration of the image display apparatus 2 is basically the same as that of the image display apparatus 1 illustrated in FIG. 1. Accordingly, the explanation thereof will be omitted here. Incidentally, the light-source unit 30, the reflection mirror 40, and the screen 50 illustrated in FIG. 1 are omitted in FIG. 9.

The aperture portion 21 is provided in the display-apparatus housing 20. Here, a light beam that is scanned by the optical scanning unit 10 onto the screen 50 or the like is so guided as to pass through this aperture portion 21. Moreover, a light-interrupting portion 22 is a partial portion of the display-apparatus housing 20. This light-interrupting portion 22 is positioned at a location at which, in the surroundings of the aperture portion 21, the optical paths of the first reflected light 61 and the second reflected light 62 are interrupted.

Here, the explanation will be given below concerning an example (i.e., third application example) where concrete numerical values are applied to the image display apparatus 2 according to the third embodiment.

First, the distance ranging from the reflection plane 131 of the rotationally-moving mirror 13 to the aperture portion 21 of the display-apparatus housing 20 is set at 10 mm Next, the numerical values are set as follows: a=+15.000°, b=+10.752°, c=+9.000°, e=−5.554°, and n=1.51431. Moreover, based on the automatic design using the computer-based light-rays tracking calculations, the relative inclination angles d and e are set as follows: Namely, at least a 1-mm distance is established from the optical paths of the first reflected light 61 and the second reflected light 62 to the optical path of the third reflected light 63 in proximity to the edge portion of the aperture portion 21. Concretely, the values are set such that d=+11.400° and e=−5.554°.

At this time, c and d satisfy the relationship given by the Expression (2). Also, the value of (d−b) and the value of (c−b) become equal to +0.648° and −1.752°, respectively. This means that the relationship given by the Expression (1) is satisfied.

Next, the calculations where the Expression (3) to Expression (10) are used result in the following calculation results: f=+20.068°, g=+4.719°, h=+25.119°, i=−28.110°, j=−17.037°, k=−33.343°, l=−24.473°, and m=−40.779°. Namely, m≤k holds, which means that m and k satisfy the relationship given by the Expression (11).

Accordingly, it can be confirmed that there actually exist the numerical values which satisfy the relationships given by the Expression (1) to Expression (11). Consequently, it has been confirmed that the image display apparatus 2 according to the third embodiment is implementable.

Figure 10:
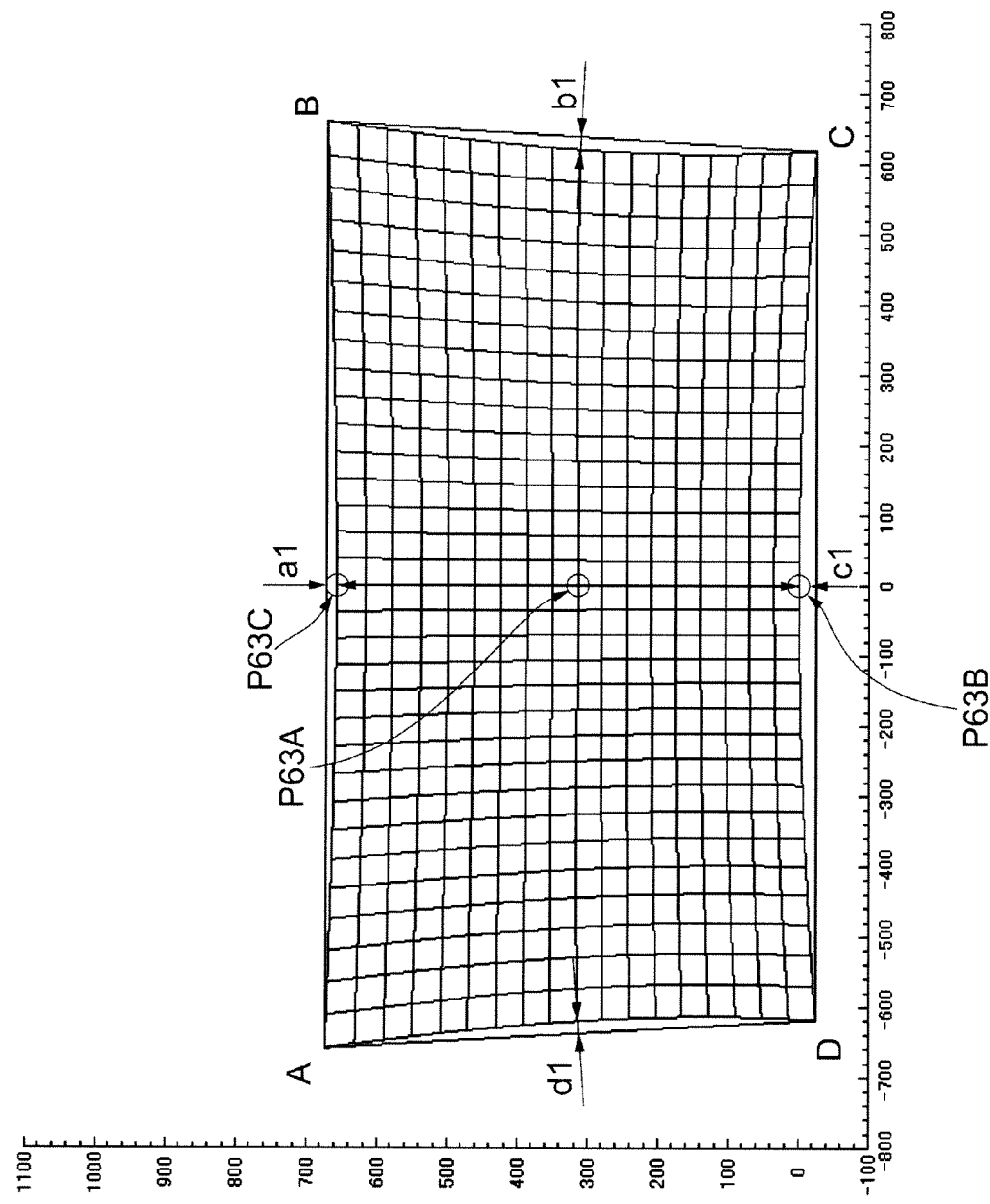
FIG. 10 is a diagram for illustrating an example of the display result of the lattice-like image displayed by the image display apparatus.

FIG. 10 illustrates the display result of a lattice-like image which is displayed by the image display apparatus 2 in the third application example. On the image illustrated in FIG. 10, the trapezoid distortions and the pincushion-shaped distortions are caused to occur. Also, in FIG. 10, P61 and P62 are not displayed. This situation makes it possible to confirm that the first reflected light 61 and the second reflected light 62 have not mixed into the image-displayed area.

Next, as is the case with the first embodiment, using the calculation method given by the Expression (12) to Expression (17), the horizontal trapezoid distortion TH, the vertical trapezoid distortion TV, the upper-side distortion T1, the lower-side distortion B1, the left-side distortion L1, and the right-side distortion R1 have been calculated. The calculation results are as follows: TH=0.0%, TV=+3.2%, T1=−4.2%, B1=−7.2%, L1=−2.8%, and R1=−2.8%.

At this time, the absolute values of the vertical trapezoid distortion TV, the upper-side distortion T1, the lower-side distortion B1, the left-side distortion L1, and the right-side distortion R1 are exceedingly smaller as compared with the values of the distortions in the image-displayed result obtained by the conventional image display apparatus illustrated in FIG. 6. Accordingly, in the case of the third application example, as compared with the case of the conventional optical scanning unit 90, the tremendous improvements have been successfully confirmed with respect to the distortions occurring on the displayed image.

According to the image display apparatus 2 like this, the first reflected light 61 and the second reflected light 62 are interrupted by the light-interrupting portion 22, and thus cannot reach the image-projected area. Consequently, it can be expected to exhibit the effect of preventing the unnecessary lights from mixing into the image-projected area, and of preventing the lowering in the displayed picture quality.

Also, according to the present image display apparatus 2, the first reflected light 61 and the second reflected light 62 can be interrupted inside the display-apparatus housing 20 by the light-interrupting portion 22. Consequently, it can be expected to exclude the unnecessary lights with more certainty as compared with the image display apparatus 1 according to the first embodiment.

(4) Other Embodiments

Incidentally, in the above-described first to third embodiments, the description has been given as follows: Namely, the light beam 60 emitted from the light-source unit 30 is reflected by the reflection mirror 40, thereby being so guided as to enter the optical scanning unit 10 or the optical scanning unit 70. The present invention, however, is not limited to this configuration. Namely, the image display apparatus 1 or the image display apparatus 2 is also allowed to be configured such that the light beam 60 emitted from the light-source unit 30 directly enters the optical scanning unit 10 or the optical scanning unit 70. In that case, the image display apparatus 1 or the image display apparatus 2 is also allowed not to include the reflection mirror 40.

Also, in the above-described first to third embodiments, the description has been given as follows: Namely, the light beam 60 transmits through the light-transmissive cover 12 or 72. This feature, in some cases, makes it possible to correct the distortions that are caused to occur on an image displayed onto the screen 50. The present invention, however, is not limited to this configuration. Namely, the image display apparatus 1 including the optical scanning unit 10 or the image display apparatus 2 including the optical scanning unit 70 is also allowed to further include the image-distortion correction unit that is commonly used for correcting image distortions. In the image display apparatus 1 or 2 like this, in addition to the image-distortion correction effect that is based on the optical scanning unit 10 or 70, it can be expected to exhibit a further image-distortion correction effect that is based on the image-distortion correction unit. Also, when there exists the image-distortion correction effect based on the optical scanning unit 10 or 70, the image-distortion correction amount based on the image-distortion correction unit can be made smaller. Consequently, it can be expected to exhibit an effect of reducing the throughput of the image-distortion correction unit.

The present invention is applicable to the optical scanning unit and the image display apparatus for two-dimensionally scanning a light beam emitted from the light-source unit, and displaying an image onto the screen or the like by utilizing the afterimage effect of this scanned light beam.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An optical scanning device, comprising:
a rotationally-moving mirror on which a reflection plane for reflecting light is provided in a rotationally-movable manner; and
a sealing unit for sealing said rotationally-moving mirror in its inside, wherein
a light-transmissive cover is provided on side of said sealing unit from which said light is entering said rotationally-moving mirror, said light-transmissive cover being formed of a light-transmissive material,
a first plane of said light-transmissive cover, a second plane of said light-transmissive cover, and said reflection plane of said rotationally-moving mirror within a rotationally-moving range being non-parallel to each other,
said first plane being on opposite side to side of said light-transmissive cover on which said rotationally-moving mirror is provided, said second plane being on said side of said light-transmissive cover on which said rotationally-moving mirror is provided,
said first plane and said second plane being provided so that a first reflected light and a second reflected light reach areas that are different from an image-projected area onto which an image is projected by a third reflected light,
said first reflected light being caused to occur such that a partial light of light that is entering said first plane is reflected by said first plane, and leaves for outside of said optical scanning device,
said second reflected light being caused to occur such that a partial light of light that has passed through said first plane is reflected by said second plane, and leaves for said outside of said optical scanning device,
said third reflected light being caused to occur such that light that has passed through said second plane is reflected by said reflection plane of said rotationally-moving mirror, and leaves for said outside of said optical scanning device.

2. The optical scanning device according to claim 1, wherein
d≥c and m≤k hold, if parameters f, g, h, i, j, k, l, and m satisfy relationships specified by the following Expressions:

[Expression 1]

$$\sin(a+b-e)/\sin(f)=n \tag{1}$$

[Expression 2]

$$\sin(g)/\sin(f+e-d)=n \tag{2}$$

[Expression 3]

$$h=g+d+c \tag{3}$$

[Expression 4]

$$\sin(-h-c-d)/\sin(i)=n \tag{4}$$

[Expression 5]

$$\sin(j)/\sin(i+d-e)=n \tag{5}$$

[Expression 6]

$$k=j-b+e \tag{6}$$

[Expression 7]

$$l=-a-b+e \tag{7}$$

[Expression 8]

$$m=l-b+e, \tag{8}$$

where a denotes incident angle of said light that is entering said first plane, b denotes inclination angle of a normal line on said reflection plane of said rotationally-moving mirror in its neutral state, c denotes maximum oscillation angle that is oscillated from said neutral state of said rotationally-moving mirror, d denotes relative inclination angle that a normal line on said second plane of said light-transmissive cover and said inclination angle b form with each other, e denotes relative inclination angle that a normal line on said first plane of said light-transmissive cover and said inclination angle b form with each other, and n denotes refractive index of said light-transmissive cover.

3. The optical scanning device according to claim 1, wherein said rotationally-moving mirror is a MEMS (: Micro-Electro-Mechanical Systems) mirror.

4. An image display apparatus, comprising:
a light-source unit for emitting light; and
an optical scanning unit for reflecting said light emitted from said light-source unit, and scanning said light toward an external display apparatus, wherein
said optical scanning unit comprises
a rotationally-moving mirror on which a reflection plane for reflecting said light is provided in a rotationally-movable manner; and
a sealing unit for sealing said rotationally-moving mirror in its inside,
a light-transmissive cover being provided on side of said sealing unit from which said light is entering said rotationally-moving mirror, said light-transmissive cover being formed of a light-transmissive material,
a first plane of said light-transmissive cover, a second plane of said light-transmissive cover, and said reflection plane of said rotationally-moving mirror within a rotationally-moving range being non-parallel to each other,
said first plane being on opposite side to side of said light-transmissive cover on which said rotationally-moving mirror is provided, said second plane being on said side of said light-transmissive cover on which said rotationally-moving mirror is provided,
said first plane and said second plane being provided so that a first reflected light and a second reflected light reach areas that are different from an image-projected area onto which an image is projected by a third reflected light, said first reflected light being caused to occur such that a partial light of light that is entering said first plane is reflected by said first plane, and leaves for outside of said optical scanning unit, said second reflected light being caused to occur such that a partial light of light that has passed through said first plane is reflected by said second plane, and leaves for said outside of said optical scanning unit, said third reflected light being caused to occur such that light that has passed through said second plane is reflected by said reflection plane of said rotationally-moving mirror, and leaves for said outside of said optical scanning unit.

5. The image display apparatus according to claim 4, wherein d≥c and m≤k hold, if parameters f, g, h, i, j, k, l, and m satisfy relationships specified by the following Expressions:

[Expression 9]

$$\sin(a+b-e)/\sin(f)=n \tag{9}$$

[Expression 10]

$$\sin(g)/\sin(f+e-d)=n \tag{10}$$

[Expression 11]

$$h=g+d+c \tag{11}$$

[Expression 12]

$$\sin(-h-c-d)/\sin(i)=n \tag{12}$$

[Expression 13]

$$\sin(j)/\sin(i+d-e)=n \tag{13}$$

[Expression 14]

$$k=j-b+e \tag{14}$$

[Expression 15]

$$l=-a-b+e \tag{15}$$

[Expression 16]

$$m=l-b+e, \tag{16}$$

where a denotes incident angle of said light that is entering said first plane, b denotes inclination angle of a normal line on said reflection plane of said rotationally-moving mirror in its neutral state, c denotes maximum oscillation angle that is oscillated from said neutral state of said rotationally-moving mirror, d denotes relative inclination angle that a normal line on said second plane of said light-transmissive cover and said inclination angle b form with each other, e denotes relative inclination angle that a normal line on said first plane of said light-transmissive cover and said inclination angle b form with each other, and n denotes refractive index of said light-transmissive cover.

6. The image display apparatus according to claim 4, further comprising:

a display-apparatus housing that is provided on outer frame of said image display apparatus, an aperture portion being formed in said display-apparatus housing in said light-scanning direction in which said light is scanned by said rotationally-moving mirror, said display-apparatus housing being so designed as to interrupt said first reflected light and said second reflected light.

7. The image display apparatus according to claim 4, wherein said optical scanning unit is a MEMS housing.

8. The image display apparatus according to claim 4, wherein said light-source unit is equipped with a semiconductor laser.

* * * * *